US009709460B2

(12) United States Patent
Leblanc et al.

(10) Patent No.: US 9,709,460 B2
(45) Date of Patent: Jul. 18, 2017

(54) METHOD AND SYSTEM FOR MEASURING AN OPTICAL LOSS VALUE OF AN OPTICAL FIBER LINK

(71) Applicant: EXFO INC., Quebec (CA)

(72) Inventors: Michel Leblanc, Quebec (CA); Stéphane Perron, Ste-Hélène-de-Breakeyville (CA)

(73) Assignee: EXFO INC., Quebec, CA (US)

( * ) Notice: Subject to any disclaimer, the term of this patent is extended or adjusted under 35 U.S.C. 154(b) by 121 days.

(21) Appl. No.: 14/575,409

(22) Filed: Dec. 18, 2014

(65) Prior Publication Data

US 2015/0198503 A1  Jul. 16, 2015

Related U.S. Application Data

(60) Provisional application No. 61/918,865, filed on Dec. 20, 2013.

(51) Int. Cl.
*G01M 11/00* (2006.01)
(52) U.S. Cl.
CPC ........ *G01M 11/31* (2013.01); *G01M 11/3145* (2013.01); *G01M 11/3172* (2013.01)
(58) Field of Classification Search
CPC .............. G01M 11/31; G01M 11/3109; G01M 11/3118; G01M 11/3127; G01M 11/3136;
(Continued)

(56) References Cited

U.S. PATENT DOCUMENTS 5,037,197 A  *  8/1991  Bukhshtab ............. G01M 11/31
                                                      356/73.1
5,137,351 A  *  8/1992  So ....................... G01M 11/3154
                                                      356/73.1
(Continued)

FOREIGN PATENT DOCUMENTS

WO      2007048226 A1     5/2007
WO      2012064736 A1     5/2012

OTHER PUBLICATIONS

Nagel, J.A., "Determination of Localized Loss in Cabled Fiber Using OTDR Measurements of Relative Mode Field Diameter", Optical Fiber Communication (OFC), Collocated National Fiber Optics Engineers Conference, Mar. 21-25, 2010, Conference on (OFC/NFOEC), pp. 1-3, .Institute of Electrical and Electronics Engineers (IEEE), San Diego (CA).

(Continued)

*Primary Examiner* — Gordon J Stock, Jr.
(74) *Attorney, Agent, or Firm* — Norton Rose Fulbright Canada LLP; Alexandre Daoust

(57) ABSTRACT

The reflectometric method for measuring an optical loss value of an optical fiber link generally comprises: obtaining at least one bias value being indicative of a bias induced by differing backscattering characteristics of a first optical fiber length and a second optical fiber length; propagating at least one test signal serially into the first optical fiber length, the optical fiber link and the second optical fiber length; monitoring at least one return signal resulting respectively from the propagation of the at least one test signal; and determining the optical loss value based on the at least one return signal and the at least one bias value.

23 Claims, 9 Drawing Sheets

(58) Field of Classification Search
CPC ......... G01M 11/3145; G01M 11/3154; G01M 11/3163; G01M 11/3172; G01M 11/3181; G01M 11/319
See application file for complete search history.

(56) References Cited

U.S. PATENT DOCUMENTS

| | | | | |
|---|---|---|---|---|
| 5,625,450 | A * | 4/1997 | Ikeno | G01M 11/31 356/73.1 |
| 6,459,478 | B1 * | 10/2002 | Schmidt | G01M 11/31 356/73.1 |
| 6,970,237 | B1 * | 11/2005 | Stolte | G01M 11/31 356/73.1 |
| 7,153,034 | B2 * | 12/2006 | Sasaoka | H04B 10/25253 356/73.1 |
| 9,134,197 | B2 * | 9/2015 | L'Heureux | G01M 11/3118 |
| 9,228,922 | B1 * | 1/2016 | Doddridge | G01M 11/3109 |
| 9,360,392 | B2 * | 6/2016 | Benjamin | G01M 11/3145 |
| 2011/0149270 | A1 | 6/2011 | Nagel et al. | |
| 2012/0176607 | A1 * | 7/2012 | Ott | G01M 11/3109 356/73.1 |
| 2013/0155391 | A1 * | 6/2013 | Achten | G01N 21/84 356/73.1 |
| 2015/0002837 | A1 | 1/2015 | Benjamin | |

OTHER PUBLICATIONS

Nagel. J.A., "Analysis of Large-Scale Optical Fiber Characterization Data Collected on a Carrier Network", 23rd Annual Meeting of the IEEE Photonics Society, Nov. 7-11, 2010, pp. 600-601, Denver (CO).

Corning Cable Systems LLC, "Uni-Directional Single-mode OTDR Measurements", Retrieved from Internet : http://csmedia.corning.com/opcommAResource_Documents\application_engineering_notes_rl\AEN003.pdf on Nov. 2013.

Anderson et al, "Optical Time-Domain Reflectometry", 1997, pp. 212-215, section 7.5.2.3, Tektronix, Inc., USA.

* cited by examiner

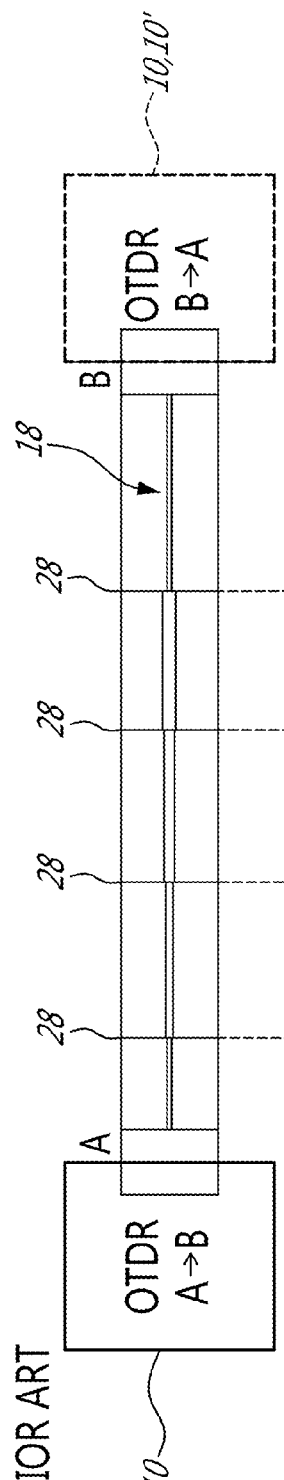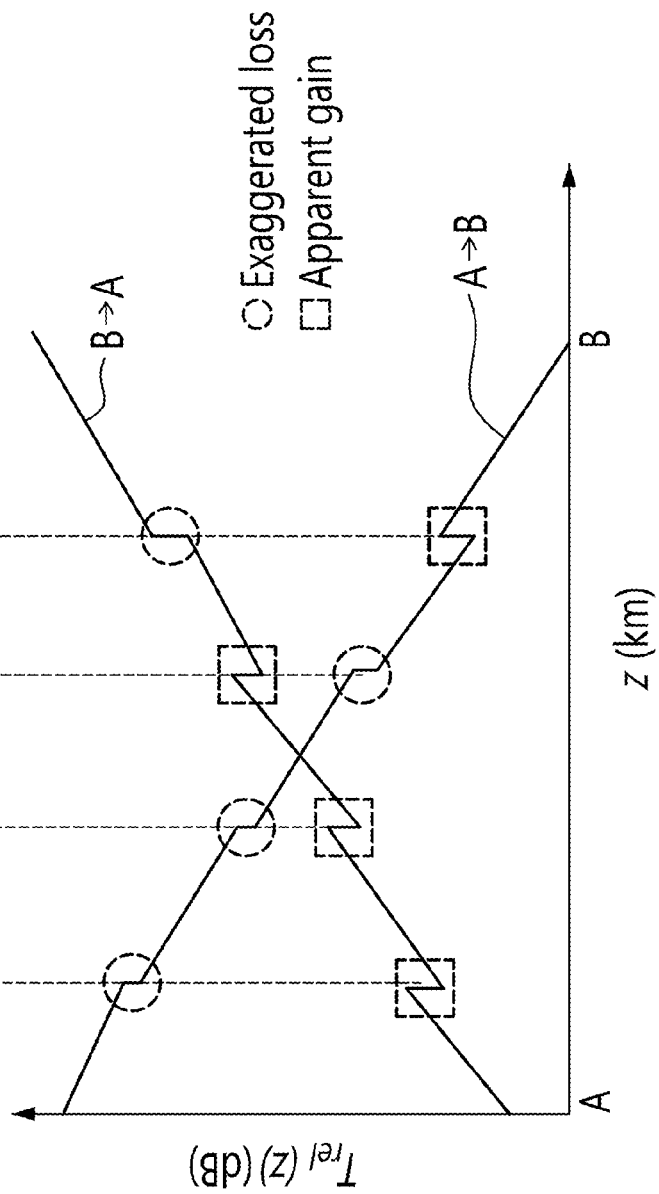
Figure 3A PRIOR ART
Figure 3B PRIOR ART

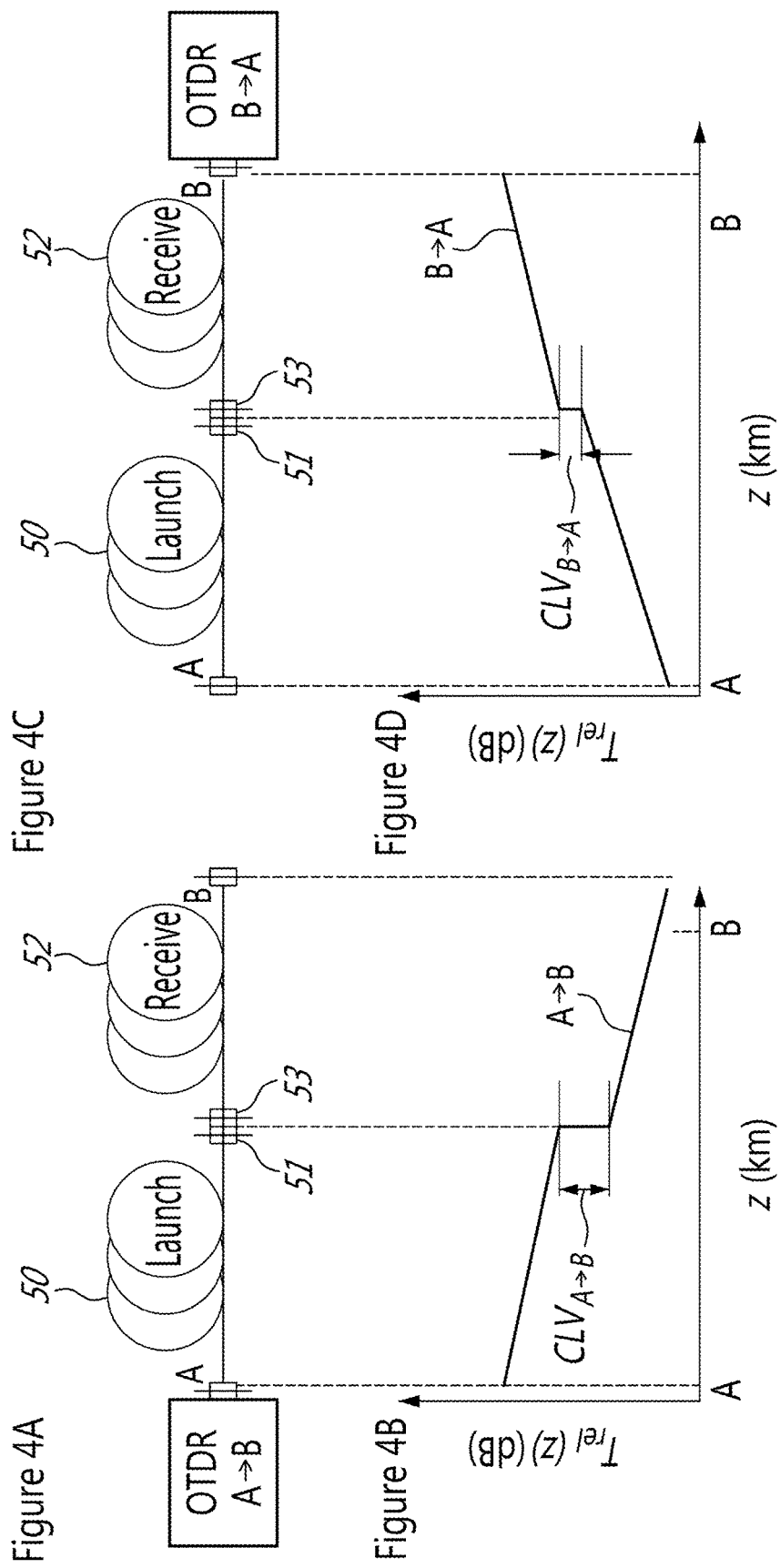

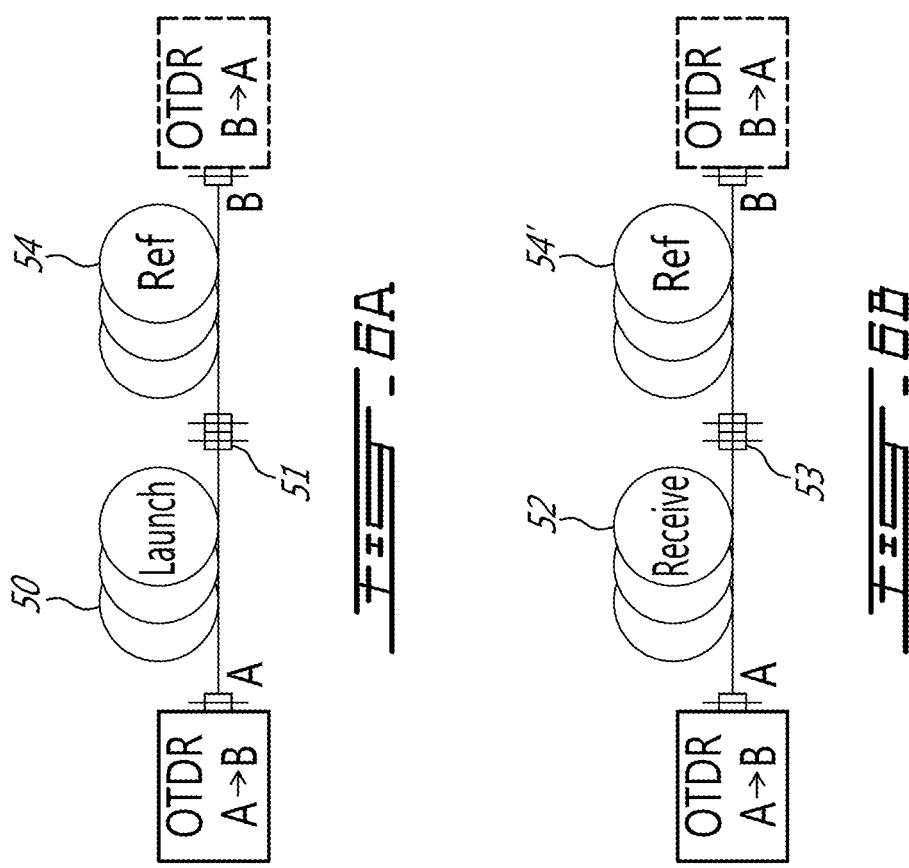

METHOD AND SYSTEM FOR MEASURING AN OPTICAL LOSS VALUE OF AN OPTICAL FIBER LINK

REFERENCE TO RELATED APPLICATIONS

This patent application claims priority of U.S. provisional Application Ser. No. 61/918,865, filed on Dec. 20, 2013, the contents of which are hereby incorporated by reference.

FIELD

The improvements generally relate to the field of optical time-domain reflectometry, and more particularly concerns optical loss measurements of an optical fiber link.

BACKGROUND

Optical Time-Domain Reflectometers (OTDRs) are devices used for characterizing optical fibers, optical fiber links and/or optical fiber networks. A typical OTDR can have an optical pulse generator, an optical detector, a processor and a storage media incorporated therein.

During the characterisation of an optical fiber link, the OTDR launches optical pulses into the optical fiber link and monitors a time-dependent reflected signal associated with each of the optical pulses to provide an OTDR trace that can be stored in the storage media for further use. From the speed of light and the known optical fiber characteristics, the acquired reflected signal may be converted into a distance-dependent representation. It is known that the reflected signal is indicative of discrete reflections and/or backscattering that occur along the optical fiber link. Hence, the OTDR trace can be analysed in order to characterize localized and distributed loss and/or reflective events of the optical fiber link, for instance.

A problem with single-end OTDR measurements is the determination of insertion loss in cases where the link under test includes a concatenation of optical fibers. Small differences in fiber geometry between the different fiber segments induce small changes in the backscattering characteristics. This geometry mismatch between spliced fibers may cause an apparent "gain" or a drop in the backscattered light of OTDR measurements, which introduces a bias in the insertion loss measurement. For this reason, the Telecommunications Industry Association (TIA) recommends the use of bi-directional OTDR analysis to average the results of single-ended OTDR measurements and properly characterize multi-fiber links (test procedure EIA/TIA FOTP-61 "Measurement of Fiber or Cable Attenuation Using an OTDR").

Backscattering characteristics are directly influenced by geometric factors such as core diameter, numerical aperture and index profile for example. Variability in geometric factors can be large when different types of fibers are connected together. However, even when all fiber segments are of the same fiber type, small geometric mismatches still may exist due to fiber manufacturing tolerances.

Although existing measurement techniques can be satisfactory to a certain degree, there remains room for improvement, particularly in terms of providing a single-ended OTDR optical loss measurement technique that is free from the aforementioned bias due to varying backscattering characteristics along the optical fiber link, and in terms of providing an optical loss measurement technique that reduces costs associated with bidirectional OTDR optical loss measurement techniques.

SUMMARY

In accordance with one aspect, there is provided a single-ended OTDR measurement technique which allow optical loss measurements of an optical fiber link formed by one or more lengths (also referred to herein as segments or portions) of optical fiber serially connected to each other, and wherein the optical loss measurement is free from a bias associated with varying backscattering characteristics along the optical fiber link. By obtaining a bias value indicative of differing backscattering characteristics of a launch fiber and of a receive fiber, a biased optical loss value measured on a single-ended OTDR trace can be adjusted to obtain the actual optical loss value.

In accordance with another aspect, there is provided a single-ended OTDR optical loss measurement technique which reduces costs associated with commonly used bidirectional OTDR loss measurement techniques. By providing an optical loss measurement technique requiring only one OTDR measurement, one avoids costs associated with transporting the OTDR between the opposing ends of the optical fiber link or costs associated with owning two distinct OTDRs.

In accordance with another aspect, there is provided a reflectometric method for measuring an optical loss value of an optical fiber link, the method comprising: obtaining at least one bias value being indicative of a bias induced by differing backscattering characteristics of a first optical fiber length and a second optical fiber length; propagating at least one test signal serially into the first optical fiber length, the optical fiber link and the second optical fiber length; monitoring at least one return signal resulting respectively from the propagation of the at least one test signal; and determining the optical loss value based on the at least one return signal and the at least one bias value.

In accordance with another aspect, there is provided a system for measuring an optical loss value occurring along an optical fiber link, the system comprising: an optical test signal generator for generating a test signal to be propagated serially along a first optical fiber length, the optical fiber link and a second optical fiber length, the first optical fiber length and the second optical fiber length being characterized by a bias value indicative of a bias induced by differing backscattering characteristics of the first optical fiber length and the second optical fiber length; an optical detector for monitoring a return signal resulting from the propagation of the test signal; and a processor configured for determining an optical loss value based on the return signal and the bias value.

In accordance with another aspect, there is provided a testing kit for measuring an optical loss value occurring along an optical fiber, the kit comprising: a first optical fiber length and a second optical fiber length, the first optical fiber length and the second optical fiber length being characterized by a bias value indicative of a bias induced by differing backscattering characteristics of the first optical fiber length and the second optical fiber length; an optical test signal generator for generating a test signal to be propagated serially along the first optical fiber length, from the first optical fiber length directly into and along the optical fiber link and from the optical fiber link directly into and along the second optical fiber length; an optical detector for monitoring a return signal resulting from the propagation of the test signal; and a processor for determining an optical loss value based on the return signal and the bias value.

In accordance with another aspect, there is provided a reflectometric method for measuring an optical loss value occurring along an optical fiber link using a single-ended optical time-domain reflectometer (OTDR) analysis, the method comprising: obtaining a first optical fiber length and a second optical fiber length; obtaining at least one bias value being indicative of a bias induced by differing backscattering characteristics of the first optical fiber length and the second optical fiber length; connecting a proximal end of the optical fiber link to the first optical fiber length and connecting a distal end of the optical fiber link to the second optical fiber length; performing a single-ended OTDR measurement on the resulting optical fiber configuration; and determining the optical loss value based on the OTDR measurement and the at least one bias value.

Throughout this specification reference is made to optical reflectometric technology and more specifically to OTDR technology. It is noted that optical reflectometric technology is herein meant to encompass all variations of optical reflectometric technology to which the provided methods, systems and kits may equivalently apply. Examples of such variations include Optical Frequency Domain Reflectometry (OFDR) (e.g., see U.S. Pat. No. 7,515,276 to FROGGATT et al), and coded OTDR technology (see Park et al. "Coded optical time domain reflectometry: principle and applications", Proc. of SPIE Vol. 6781, 678129 (2007)) also referred to as correlation OTDR. Other variations are also meant to be encompassed.

For simplicity, examples detailed herein below consider changes in backscattering characteristics that are directly related to mode field diameter (MFD) variations. It is understood that changes in MFD can originate from multiple sources (core diameter, numerical aperture, refractive index profile, etc.). Moreover, it will be understood that other physical parameters may also modify the backscattering characteristics, e.g., the material composition of the optical fiber.

Many further features and combinations thereof concerning the present improvements will appear to those skilled in the art following a reading of the instant disclosure.

DESCRIPTION OF THE FIGURES

In the figures,

FIG. 3A shows a block diagram illustrating a bidirectional OTDR measurement on an optical fiber link having differing mode field diameters;

FIG. 3B shows an example of a forward OTDR trace and a backward OTDR trace associated with the optical fiber link of FIG. 3A;

FIG. 4A shows a block diagram illustrating a single-ended OTDR measurement allowing the measurement of a forward connection loss as shows in FIG. 4B;

FIG. 4B shows an example of a forward OTDR trace resulting from the single-ended OTDR measurement illustrated in FIG. 4A;

FIG. 4C shows a block diagram illustrating a single-ended OTDR measurement allowing the measurement of a backward connection loss as shows in FIG. 4D;

FIG. 4D shows an example of a backward OTDR trace resulting from the single-ended OTDR measurement illustrated in FIG. 4C;

FIG. 6A shows a block diagram illustrating a bidirectional OTDR measurement made on a launch fiber that is connected to a reference fiber;

FIG. 6B shows a block diagram illustrating a bidirectional OTDR measurement made on a reference fiber that is connected to a receive fiber;

DETAILED DESCRIPTION

Figures 1A, 1B:
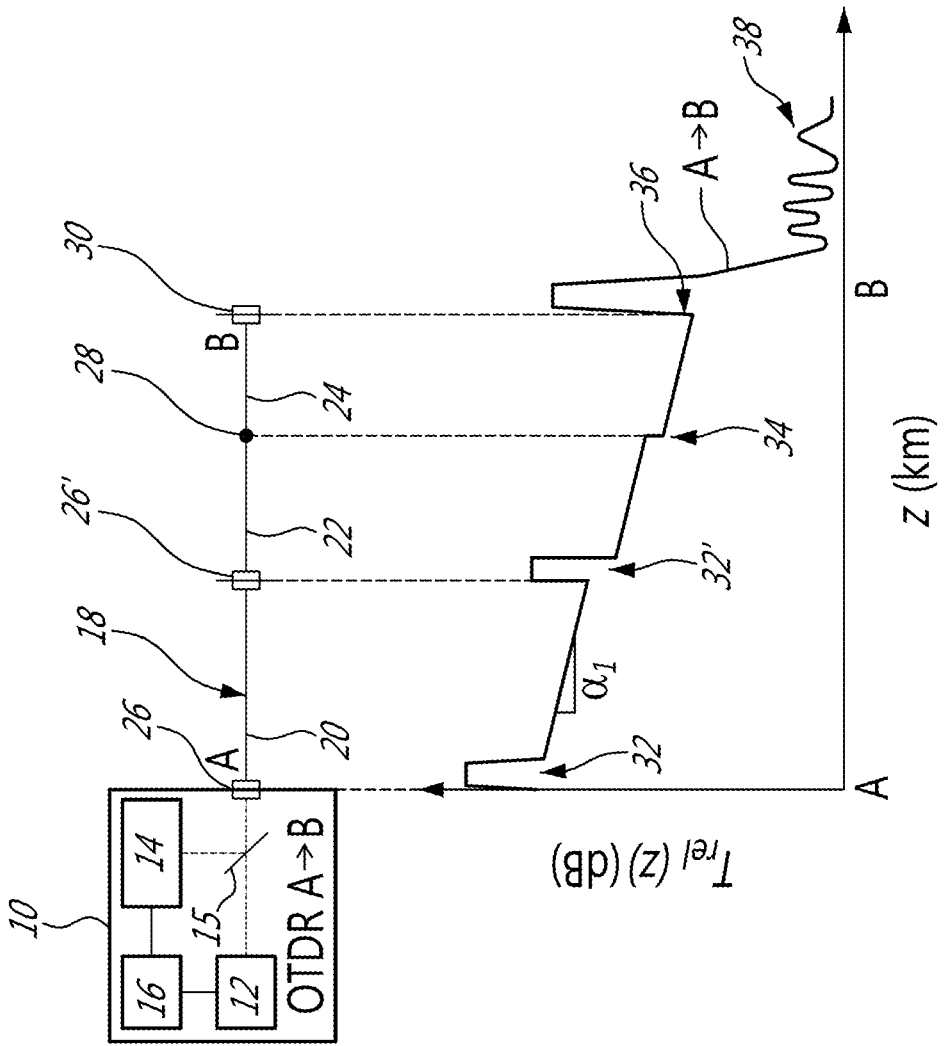
FIG. 1A shows a block diagram illustrating a single-ended OTDR measurement on an optical fiber link.
FIG. 1B shows an example of an OTDR trace associated with the optical fiber link of FIG. 1A.

FIG. 1A shows a block diagram illustrating an Optical Time-Domain Reflectometer 10 (OTDR) having an optical pulse generator 12, an optical detector 14, and a computer 16 including at least a processor and a storage media. As mentioned above, OTDRs are devices that allow characterisation of optical fibers, optical fiber links and/or optical fiber networks. As it can be seen in FIG. 1A, the OTDR 10 can be used to characterise an optical fiber link 18 having a variable number of lengths of optical fiber and/or other components (e.g. optical couplers) concatenated together so as to preserve optical continuity (e.g. mated with optical connectors or with fusion splices).

FIG. 1A shows a specific example of an optical fiber link 18 that may be characterized using an OTDR 10. In this illustrated example, the optical fiber link 18 includes a first length of optical fiber 20, a second length of optical fiber 22 and a third length of optical fiber 24. An end of the first length of optical fiber 20 is connected directly to the OTDR 10 using a connector 26. The other end of the first length of optical fiber 20 is connected to an end of the second length of optical fiber 22 using another connector 26' and the other end of the second length of optical fiber 22 is connected to an end of the third length of optical fiber 24 via a fusion splice 28. In this situation, the other end of the third length of optical fiber 24 has an open connector 30, for instance. It is readily understood that any type of connector can be used. Typically, physical contact (PC) connectors or angled physical contact (APC) connectors are suited for this purpose.

As the OTDR 10 launches a pulsed light signal into and along the optical fiber link 18, the OTDR 10 also monitors, as a function of time, a return light signal. The timedependence of the monitored signal, P(t), may be converted to a distance-dependence to yield an OTDR trace, P(z), using the relation:

$$z = \frac{c \cdot t}{2 n_g(\lambda)}; \quad (1)$$

where z is the distance, c is the speed of light in vacuum, t is the time, and $n_g$ is the group refractive index in the optical fiber link at the wavelength corresponding to the pulsed light signal. The factor 2 arises since the distance z denotes a one-way distance from the launch point to the point of possible reflection (or backscattering) in the optical fiber link, whereas the time t represents the round-trip time of the light pulse, i.e. from the launch point to the point of reflection and back again.

The acquired data associated with the power level of the return light signal as a function of time is referred to herein as the OTDR trace, where the time scale is representative of distance between the OTDR 10 and a point along the optical fiber link 18.

The pulsed signal "forward" propagates from the optical pulse generator 12 into the optical fiber link 18, and the return signal arising from backscattering and reflections along the optical fiber link "backward" propagates from the optical fiber link 18 to the optical detector 14. This routing of a portion of the return signal to the optical detector may be implemented by means of an optical fiber coupler, an optical circulator or a beam splitter 15. The return signal generally includes a reflected contribution and a backscattered contribution.

The reflected contribution of the return signal comprises reflections occurring at discrete locations, normally corresponding to where the optical fiber link has refractive index mismatches. In particular, discrete reflections can be due to optical connections, fusion splices or micro- or macrobends. These generally are discernable as distinct peaks on the OTDR trace.

On the other hand, the backscattered contribution of the return signal, $P_{scat}(z)$, comprises Rayleigh scattering stemming from the interaction of the travelling light with the optical fiber media all along the optical fiber link, resulting in an OTDR trace exhibiting a generally decaying signal over distance (in logarithmic units, i.e. dB, on the ordinate).

Theoretically, the backscattered contribution for a single-mode optical fiber that has no connections or fusions splices is known to vary as:

$$P_{scat}(z) = C \cdot \frac{\lambda^2}{MFD^2(z)} \cdot P_0 \cdot \tau_W \cdot 10^{-\alpha \cdot z/5}; \quad (2)$$

where, z is the distance, C is a factor that depends on physical parameters of the optical fiber, λ is the wavelength (in μm), $P_0$ is the peak power injected in the optical fiber (at z=0), $\tau_W$ is the pulse width (in m), α is the attenuation coefficient, and MFD is the mode field diameter (in μm). It is readily understood that λ, $P_0$, $\tau_W$ are constant for an OTDR measurement, and that C can be fairly stable over distance. Moreover, it is known that any deviations and/or fluctuations of the MFD along a single segment of optical fiber tend to be fairly small and occur gradually (over few hundreds of meters for example), and typically arise during the fiber fabrication process. However, variations in MFD along the optical fiber link tend to be more pronounced and localized at a junction point for cases where different optical fiber types are spliced or otherwise mated together. Differences in MFD corresponding to different concatenated optical fiber types in a link may lead to different degrees of backscattered light in response to OTDR test pulses. As a consequence, MFD mismatch between spliced fibers may cause an apparent "gain" or a drop in the OTDR trace, which is not related to the real loss at the point of concatenation (e.g. at a fiber splice). For example, a fiber splice may appear as a gain in the OTDR trace due to MFD mismatch between the spliced fibers. An OTDR measurement performed from the opposite end on the same fiber splice would conversely result in an overestimation of the splice loss. For this reason, single-end OTDR measurements do not suffice for proper characterization of such connections.

One skilled in the art will readily understand that, in the context of OTDR methods and systems, each light acquisition generally involves propagating a large number of substantially identical light pulses in the optical fiber link and averaging the results. In this case, the result obtained from averaging will herein be referred to as an OTDR trace. It will also be understood that other factors may need to be controlled during the light acquisitions or from one light acquisition to the next, such as gain settings, pulse power, etc. as is well known to those skilled in the art. For convenience, OTDRs usually display a logarithmic representation, T(z), of the return signal P(z) corresponding to the relation T(z)=5×log P(z), so that T(z) represents a relative power level of the return light as a function of the distance along the length of the optical fiber link. It should be noted that use of the factor "5" rather than a factor "10" (the latter being more typically employed when using dB units) in the expression for T(z) arises since the return signal monitored by the OTDR actually travels back and forth and hence experiences twice the "one-way" attenuation. Since it is more convenient and intuitive to the user to display the one-way attenuation, 5×log P(z) is employed. It also should be noted that only the variation of T(z) is relevant, since the OTDR always performs relative measurements by comparing T(z) at two distinct locations, for instance. Thus, absolute values of T(z) are irrelevant and an arbitrary level for T(z=0) can be chosen. In embodiments described in this specification, the arbitrary level is set to T(z=0)=0 dB, and hence T(z) reflects the measured cumulative optical loss along the optical fiber link measured.

As an example, FIG. 1B shows an OTDR trace A→B of the optical fiber link 18 of FIG. 1A. The OTDR trace shows a relative power level $T_{rel}$ as a function of distance. It can be seen that the connections 26 and 26' give rise to Fresnel reflections 32 and 32' on the OTDR trace A→B. Moreover, the fusion splice 28 linking the second length of optical fiber 22 and the third length of optical fiber 24 can be associated with a discrete loss at 34, and the open connector 30 can be associated with the Fresnel reflection at 36, typically in the order of 4% for a perpendicularly-cleaved glass-air interface. The decaying slopes, associated with the different lengths of optical fiber, of the OTDR trace A→B of FIG. 1B can be associated with a corresponding attenuation coefficient, which is characteristic of the optical fiber. For instance, the first length of optical fiber 20 has an attenuation coefficient $\alpha_1$. The steep drop after peak 36 of the OTDR trace A→B indicates the end B of the optical fiber link 18. Finally, the artefacts represented at 38 can be ascribed to noise, since they are identified as being positioned beyond the end B of the optical fiber link 18.

In the figures and in the specification, a single-ended OTDR measurement from an end A to an end B of an optical fiber link is identified as A→B, whereas the single-ended OTDR measurement from an end B to an end A of an optical fiber link is identified as B→A. As the OTDR trace A→B is often referred to as a forward OTDR trace, the OTDR trace B→A is referred to as a backward trace. In order to facilitate understanding of the figures, block diagrams and OTDR traces presented therein may label both ends of the optical fiber link with "A" and "B" tags.

In practice, the backscattering characteristics of an optical fiber link can vary along the length of the link, typically arising from corresponding variations of its MFD. It is known that variation of the backscattering characteristics from one optical fiber to another is mostly dominated by the difference in MFD, but other intrinsic characteristics of the optical fibers, such as its material composition, may also contribute to this variation. With regards to equation (2), one may notice that where the MFD suddenly increases, the backscattered signal $P_{scat}(Z)$ abruptly decreases, and oppositely; as the MFD decreases, the backscattered signal $P_{scat}(z)$ increases.

Figure 2A:
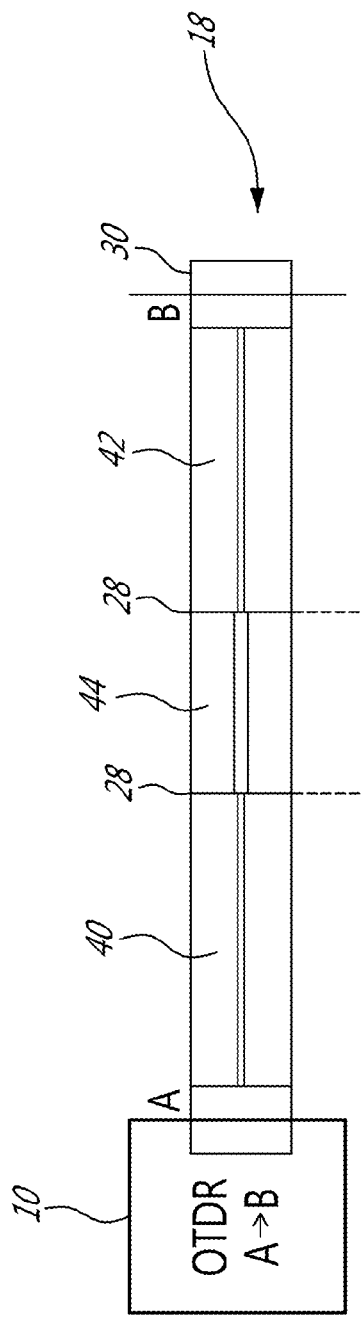
FIG. 2A shows a block diagram illustrating a single-ended OTDR measurement on an optical fiber link having differing mode field diameters.
Figure 2B:
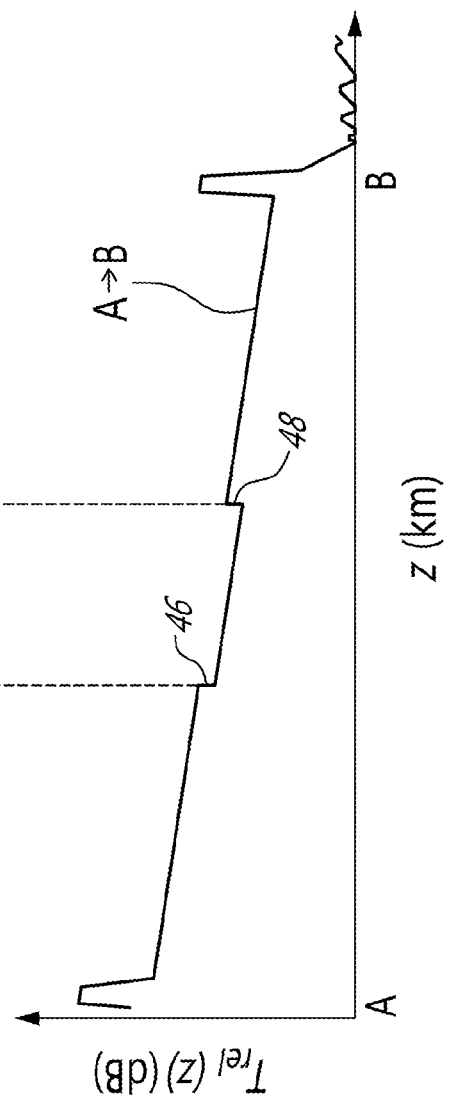
FIG. 2B shows an example of an OTDR trace associated with the optical fiber link of FIG. 2A.

FIG. 2A is a block diagram illustrating an OTDR 10 configured to perform a single-ended OTDR measurement on the optical fiber link 18 from end A to end B. It will be readily understood that the illustration of the optical fiber link 18 in FIG. 2A is only schematic in that the size of the cores and claddings of the optical fibers are largely exaggerated compared to their length and to the size of the OTDR 10 in order to illustrate the variation of the MFD therealong. As such, the optical fiber link 18 comprises a first segment of optical fiber 40 and a third segment of optical fiber 42 each having a MFD smaller than the MFD of a second segment of optical fiber 44 juxtaposed between the first 40 and second 42 segments of optical fiber of the optical fiber link 18. Although the first segment of optical fiber 40, the second segment of optical fiber 44, and the third segment of optical fiber 46 are illustrated to be connected via fusion splices 28, it is understood that they could be connected using connectors or any other mating means. The optical fiber link 18 terminates with an open connector 30. FIG. 2B shows the OTDR trace A→B that can result from the single-ended OTDR measurement of the optical fiber link 18 of FIG. 2A. Accordingly, due to differing MFDs, the OTDR trace A→B can exhibit an exaggerated loss 46 and an apparent gain 48. However, it is readily understood that the artefacts 46 and 48 include a bias introduced by the variation of MFDs. Therefore, if one were to perform a single-ended OTDR optical loss measurement of the optical fiber link 18, the measurement would not be reliable, as it would be biased by the variation of backscattering characteristics among the three segments of the optical fiber link 18.

To overcome this problem, the Telecommunications Industry Association (TIA) therefore recommends the use of bi-directional OTDR analysis to properly characterize multi-fiber links (test procedure EIA/TIA FOTP-61 "Measurement of Fiber or Cable Attenuation Using an OTDR"). This technique compares a forward OTDR trace A→B with a backward OTDR trace B→A in order to cancel the bias introduced by varying backscattering characteristics along an optical fiber link.

FIG. 3A shows a block diagram illustrating a bidirectional OTDR measurement on an optical fiber link 18. As in FIG. 2A, the size of the cores and claddings of the optical fibers are largely exaggerated compared to their length and to the size of the OTDR 10. Such a measurement can be carried out using one OTDR 10, which typically requires a technician to measure a forward trace A→B from the end A of the optical fiber link 18 and then to measure a backward trace B→A from the end B of the optical fiber link 18. Since the end A may be separated by hundreds of kilometers from the end B, the bidirectional OTDR measurement performed with one OTDR 10 can be costly, as the OTDR 10 would have to be displaced between the two ends of the optical fiber link. Alternatively, two technicians each having an OTDR could separately and independently measure the forward OTDR trace and the backward OTDR trace using distinct OTDRs 10 and 10'. However, this technique necessitates two distinct OTDRs, which also can be costly.

In the example of FIG. 3A, the optical fiber link 18 has five lengths of optical fiber having each differing MFDs, wherein the five lengths of optical fiber are serially connected via fusion splices 28. However, even though the five lengths of optical fiber are illustrated as being connected via fusion splices 28, it is understood that they could be mated using connectors or any alternative connection means therefor. FIG. 3B shows forward and backward OTDR traces A→B and B→A associated with the optical fiber link 18 of FIG. 3A. The backward OTDR trace is inverted with respect to z hence allowing distances along the optical fiber link to match with that of the forward OTDR trace. This graph identifies exaggerated losses (marked with dotted circles) and apparent gains (marked with dotted squares) in both the forward OTDR trace and the backward OTDR trace. With such a graph, cancelling a bias introduced by differing backscattering characteristics is straightforward as one can subtract the backward OTDR trace from the forward OTDR trace. Indeed, when performing:

$$T'(z) = \frac{T_{A \to B}(z) - T_{B \to A}(z)}{2}; \quad (3)$$

the optical fiber loss value can be evaluated without the bias associated with the variation of MFD.

In the evaluation of an optical loss value from a single-ended OTDR measurement, one can associate a measured optical loss value as being the addition of an actual optical loss value OLV with a bias value BV introduced by varying MFDs, where the bias value is known to vary as:

$$BV_{1 \to 2} = 10 \times \log\left(\frac{MFD_2}{MFD_1}\right); \quad (4)$$

where $BV_{1 \to 2}$ is associated with the bias value between a first optical fiber length and a second optical fiber length. Accordingly, for an optical fiber link comprising four different concatenated optical fiber lengths, the bias value is given by:

$$BV_{1 \to 4} = \quad (5)$$
$$10 \times \left(\log\left(\frac{MFD_2}{MFD_1}\right) + \log\left(\frac{MFD_3}{MFD_2}\right) + \log\left(\frac{MFD_4}{MFD_3}\right)\right) = 10 \times \log\left(\frac{MFD_4}{MFD_1}\right);$$

where it is noted that only the bias introduced by the variation of backscattering characteristics between the first and the last lengths of optical fiber matters. Hence, it is not necessary that the bias introduced by the intermediary lengths of optical fiber ($MFD_2$ and $MFD_3$ in this case) be known in order to evaluate the optical loss value of the optical fiber link between the first and last lengths, as long as the respective biases of these first and last lengths are well known, or appropriately calibrated.

Henceforth, this disclosure presents a single-ended reflectometric method allowing the measurement of an optical loss value of an optical fiber link without the bias inherently introduced by varying backscattering characteristics of lengths of optical fiber comprised in the optical fiber link under test. To do so, one can calibrate a first length of optical fiber (the "launch fiber") with a second length of optical fiber (the "receive fiber") in order to obtain a bias value, which can be used to determine an actual optical loss value in the optical fiber link under test.

In accordance with the aforementioned, the bias value can be obtained by calibrating a launch fiber with a receive fiber or by calibrating a launch fiber with a length of reference fiber (referred to as "reference fiber") and then by calibrating a reference fiber with a receive fiber, as will be separately detailed hereinbelow.

FIGS. 4A through 4D illustrate a calibration procedure for launch fiber 50 and receive fiber 52. One may connect an end 51 of the launch fiber 50 to an end 53 of the receive fiber 52 to form a "calibration optical fiber link" and perform a bidirectional OTDR measurement. It is noted that during the whole procedure, the pair of fibers should remain connected in order that the obtained bias value be accurate. In particular, FIG. 4A and FIG. 4C show, respectively, block diagrams illustrating exemplary configurations for obtaining a forward OTDR trace A→B and a backward OTDR trace B→A on the pair of launch and receive fibers 50 and 52. Once the bidirectional OTDR measurements have been performed, one can identify an average connection loss value by averaging a forward connection loss value $CLV_{A\_B}$ and a backward connection loss value $CLV_{B\_A}$. However, the difference between the $CLV_{A\_B}$ and the $CLV_{B\_A}$ represents the bias value introduced by the single-ended measurement. Indeed, the bias value $BV_{A\_B}$ can be computed by:

$$BV_{A\to B} = \frac{CLV_{A\to B} - CLV_{B\to A}}{2}. \quad (6)$$

Once the bias value has been so obtained, an optical loss value of an optical fiber link can be determined, independent of potential differences in backscattering characteristics along the optical fiber link. It is noted that ends 51, 53, which are connected together during the calibration procedure, will preferably also be the same ends 51, 53 that subsequently will be directly connected to the respective opposing ends of the optical fiber link under test. If such a connection procedure is not carried out, variations in MFD along the length of either the launch fiber 50 or the receive fiber 52 or both may lead to an imprecise bias value. That being said, if the MFD is known to be sufficiently constant along both the launch fiber 50 and the receive fiber 52, any end of the launch and receiver fibers 50, 52 may then be used to connect to the optical fiber link under test.

One skilled in the art would appreciate that the bias value obtained with a pair of launch and receive fibers may be considered to be constant over time. Indeed, the geometry or the backscattering characteristics of the two fibers do not change significantly with time. Accordingly, one may only need to calibrate a pair of launch and receive fibers once, for instance "at the factory", in order to perform optical loss measurement using a single-ended OTDR trace for an indefinite period of time. Of course, the calibration may also be performed at the test site or anywhere else.

Figures 5A, 5B:
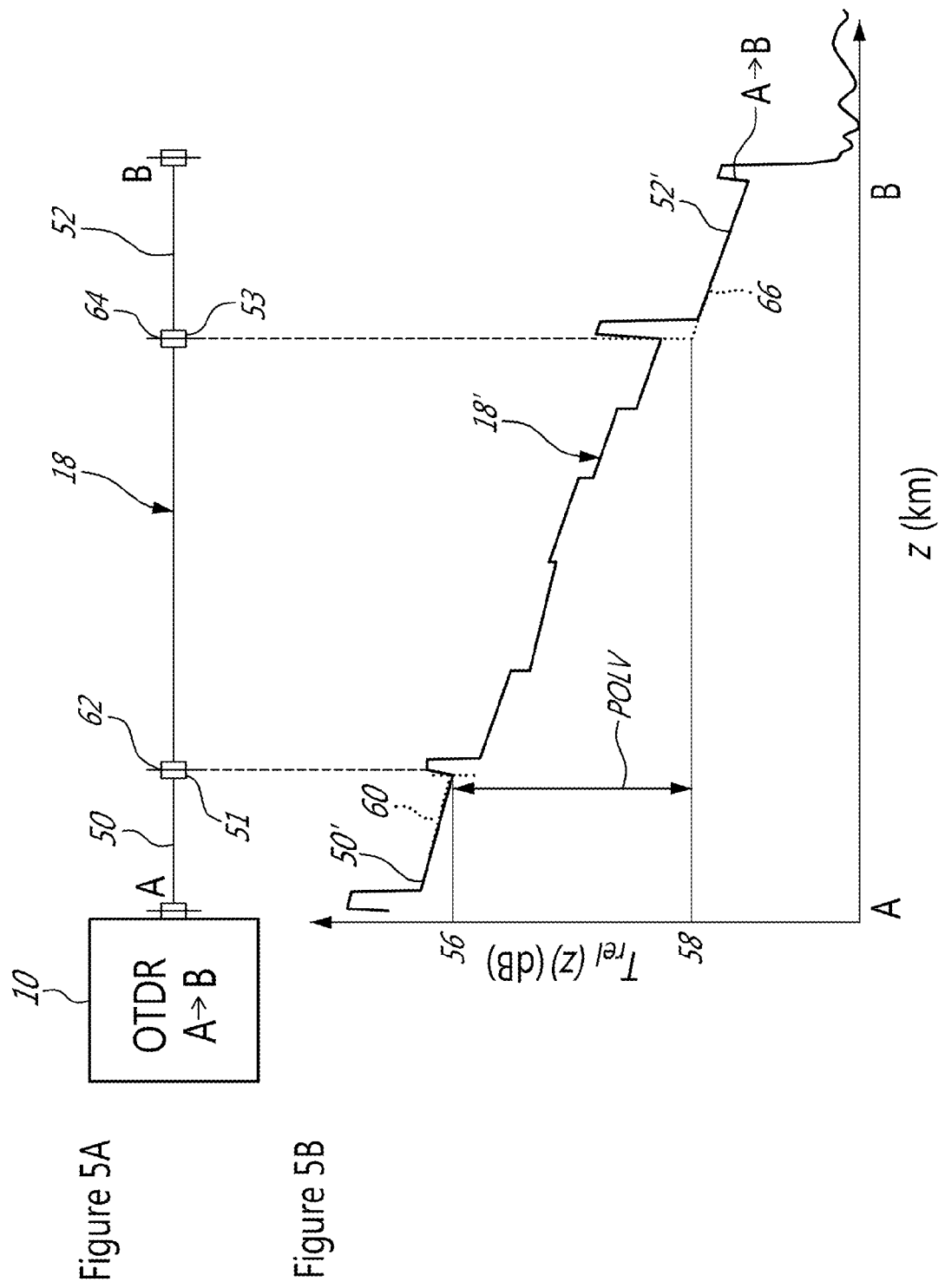
FIG. 5A shows a block diagram illustrating a single-ended OTDR measurement on a launch fiber directly connected to the proximal end of an optical fiber link and receive fiber connected to the distal end thereof.
FIG. 5B shows an example of an OTDR trace associated with the block diagram of FIG. 5A which allow measurement of a preliminary optical loss value.

Referring to FIG. 5A, one may connect one end A of a launch fiber 50 to the OTDR 10, and the end 51 of the launch fiber 50 to one end of the optical fiber link under test 18 via a connection 62, whereas the other end of the optical fiber link 18 is connected to the end 53 of the receive fiber 52 via a connection 64. In this configuration, the launch fiber 50, the optical fiber link 18 and the receive fiber 52 may be collectively referred to as a "complete" optical fiber path. Accordingly, the OTDR 10 can measure the complete optical fiber path in order to provide the resulting OTDR trace, shown in FIG. 5B. The OTDR trace A→B shows the return signal as a function of distance, wherein portions 50', 18' and 52' of the return signal can be associated, respectively with the launch fiber 50, the optical fiber link 18 and the receive fiber 52. To measure the optical loss value, one may subtract the calculated bias value $BV_{A\_B}$ from a preliminary optical loss value POLV of the optical fiber link 18 in order to obtain an actual optical loss value OLV free from the bias introduced by varying backscattering characteristics among the optical fibers of the optical fiber link 18. Indeed, as mentioned above:

$$OLV=POLV-BV_{A\to B}. \quad (7)$$

As readily understood by one skilled in the art, the optical fiber link 18 should ideally be connected to the end 51 of the launch fiber 50 and the end 53 of the receive fiber 52 since the bias value measured is dependent on the MFD at ends 51 and 53. The launch fiber 50 and the receive fiber 52 are therefore directional and are to be used accordingly in the measurement of an optical loss value OLV. That being said, if the MFD is sufficiently uniform along the launch and the receiver fiber 50, 52 (within an acceptable tolerance), their individual directionality may be ignored.

Still referring to FIG. 5B, it is noticed that the POLV value can be measured by the difference between a first return light signal value 56 at the connection 62 and a second return light signal value 58 at the connection 64. Such a POLV value includes the loss due to these two connections. At one end, as it can be seen from FIG. 5B, the first return light signal value 56 is estimated by computing a first Least Square Fit (LSF) (illustrated with dotted line 60) to fit the attenuation of the portion 50'. The evaluation of the first return light signal value 56 is done by extending the LSF 60 to the beginning of the loss associated with connection 62, therefore the first return light signal value 56 corresponds to the backscattering light level just before connection 62 between the launch fiber 50 and the optical fiber link 18. At the other end, the second return light signal value 58 is estimated by computing a second LSF (illustrated with dotted line 66) to fit the attenuation of the portion 52' associated with the launch fiber 52. The evaluation of the second return light signal value 58 is done by extending the LSF 66 to the point corresponding to connection 64, such that the second return light signal value 58 corresponds to the backscattering light level just after connection 64 between the optical fiber link 18 and the receive fiber 52.

In another embodiment, the optical loss value OLV can be determined otherwise. In this embodiment, the bias value $BV_{A\_B}$ associated with the launch and receive fibers 50 and 52 can be attributed to either the first or second return light signal values 56 and 58. For instance, the first return light signal value 56 can be modified with the bias value $BV_{A\_B}$ in order to obtain a modified first return light signal value 56'. Alternatively, the first return light signal values 56 can be modified with, e.g., half of the bias value (0.5 $BV_{A\_B}$) in order to obtain a modified first return light signal value 56' and the second return light signal values 58 can be modified with, e.g., half of the bias value (0.5 $BV_{A\_B}$) in order to obtain a modified second return light signal value 58'. By doing so, the measurement of the preliminary optical loss value POLV (then obtained by the difference between the modified first return light signal value 56' and the modified second return light signal value 58') can yield an optical loss value free from the bias due to differing MFDs along the optical fiber link 18.

In one embodiment, in order to calibrate a launch fiber 50 independently from a receive fiber 52, each may be referenced against two reference fibers 54,54', the reference fibers 54 and 54' having matching backscattering characteristics. Indeed, it may be suitable to calibrate the launch fiber 50 remotely located from the receive fiber 52. For example, the launch and receive fibers 50, 52 could be calibrated independently at manufacturing, relative to reference fibers. Respective relative bias values could then be marked on the launch and receiver fibers 50, 52 so that it is not necessary to calibrate the launch and receive fibers 50, 52 together at the test site. As long as they are calibrated relative to the same reference, the launch and receive fiber 50, 52 never have to be connected together to obtain the bias value. In order to obtain a bias value allowing cancellation of the bias introduced by varying backscattering parameter among the optical fiber link, one may perform the bidirectional OTDR measurements exemplified in block diagrams of FIG. 6A and FIG. 6B. Referring specifically to FIG. 6A, forward and backward connection loss values $CLV_{A\_B}$ and $CLV_{B\_A}$ can be obtained, which can be used to calculate a first relative bias value $RBV_L$ between the launch fiber 50 and a first reference fiber 54. Now referring to FIG. 6B, forward and backward connection loss values $CLV_{A\_B}$ and $CLV_{B\_A}$ can be obtained, which can be used to calculate a second relative bias value $RBV_R$ between the receive fiber 52 and the second reference fiber 54'. The total bias value corresponding to the pair of launch and receive fibers 50, 52 can be obtained by subtracting the first and second relative bias values ($BV=RBV_L-RBV_R$). Otherwise, the first relative bias value $RBV_L$ can be used to adjust the level of portion 50' of the return light signal (referring to FIG. 5B) while the second relative bias value $RBV_R$ can be used to adjust the level of portion 52' of the return light signal. This is equivalent to calculating an adjusted OTDR trace as would be obtained if the launch and receiver fibers 50, 52 were to be the reference fiber 54 or 54'. In this embodiment, once the portions 50' and 52' are modified using their corresponding relative bias values, the measurement of the preliminary optical loss value POLV as described above can yield an optical loss value free from the bias associated with the differing MFDs along the optical fiber link 18.

It is readily understood that the first and the second reference fibers 54 and 54' can be cut from a common spool of reference optical fiber, from two different spools of the same reference optical fiber and two different spools of two reference optical fibers, provided that the first and the second reference fibers 54 and 54' have the same backscattering characteristics within an accepted tolerance. Moreover the reference fibers 54 and 54' could be the exactly the same optical fiber. With reference fibers having matching backscattering characteristics, the bias introduced is null. Henceforth, these reference fibers are suitable for the calibration of pairs of launch and receive fibers.

Figure 7:
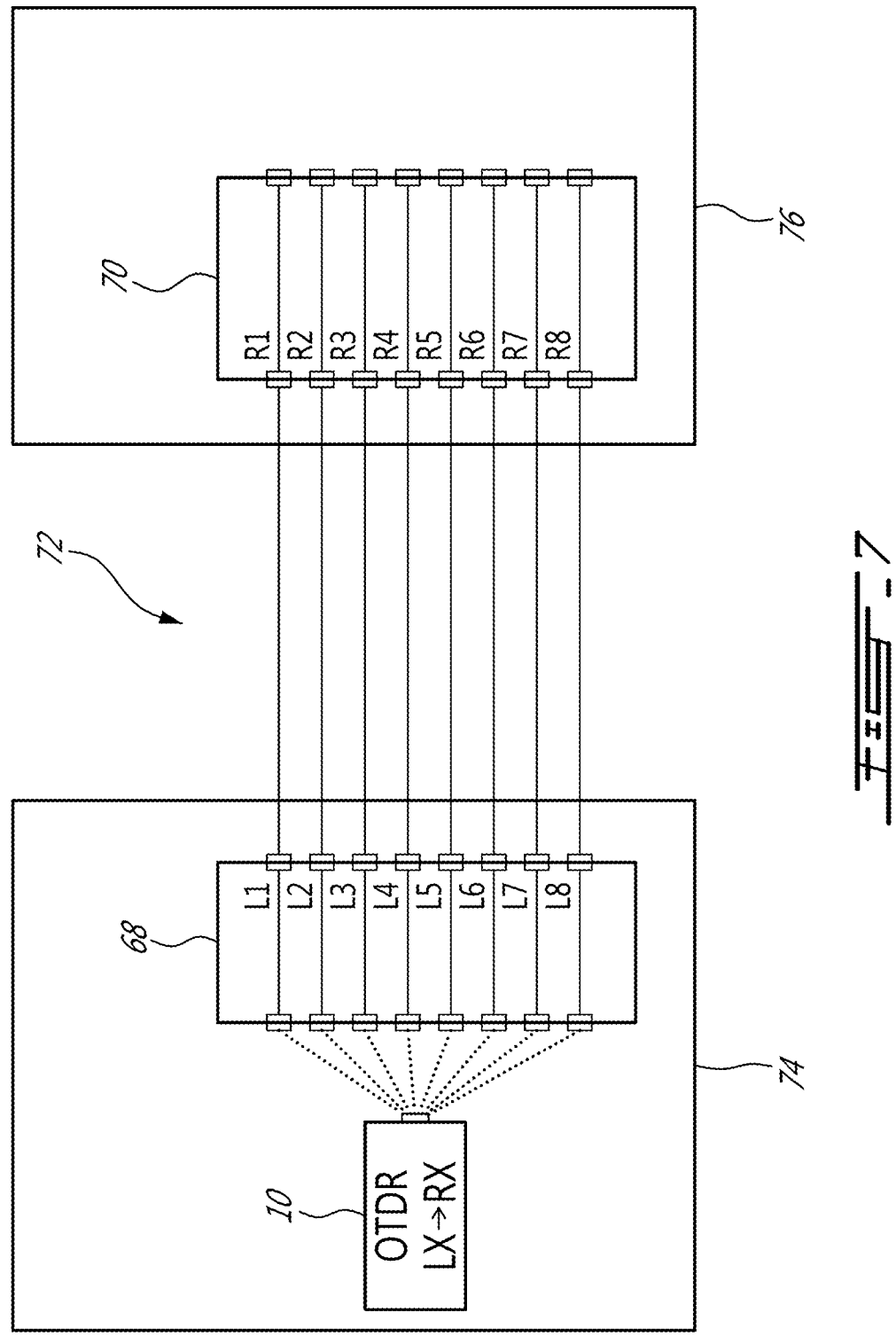
FIG. 7 shows a block diagram illustrating single-ended OTDR measurement on a multiplicity of optical fiber links having co-located respective launch and receive ends (e.g. an optical cable) using a corresponding multiplicity of launch fibers and receive fibers.

Referring to FIG. 7, another embodiment may include a multitude of launch fibers (L1, L2, ... , LX), which together comprise a launch cable 68, and a multitude of receive fibers (R1, R2, ... , RX), which provide a corresponding receive cable 70. In this case, each of the fibers 50 of the launch cable 68 can be calibrated to a corresponding one of the fibers of the receive cable 70 for allowing multiple single-ended OTDR optical loss measurements to be performed on an optical fiber cable constituting multiple optical fiber links 72 (e.g. a multi-fiber array cable or link). Such launch and receive cables 68, 70 can be provided with an accompanying matrix having bias values for each combination of launch and receive fibers, for instance. Therefore, a technician located at a first location 76 can connect the receive fibers of the multiplicity of receive fibers to a corresponding optical fiber cable while another skilled technician located at a second location 74 and having the OTDR 10 can connect the launch fibers of the multiplicity of receive fibers and perform OTDR optical loss measurements free from biases due to differing MFDs along each of the optical fiber links.

Figure 8:
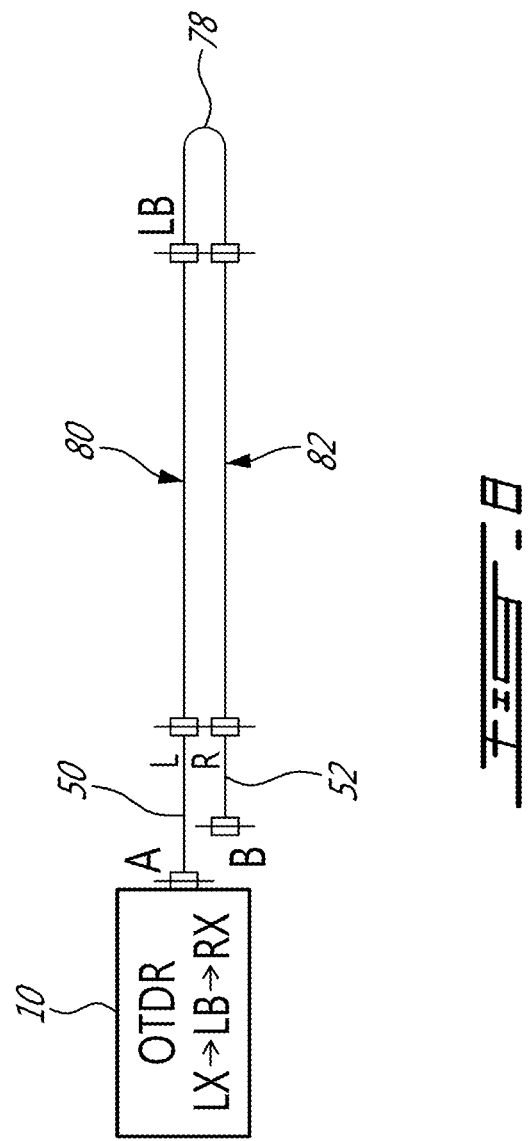
FIG. 8 shows a block diagram illustrating a single-ended OTDR measurement on two different optical fiber links via the use of a loopback fiber.

Now referring to FIG. 8, the pair of launch and receive fibers can be used along with one (or more than one) loopback (LB) fibers 78. In this embodiment, one single-ended OTDR measurement can provide optical loss measurements for a plurality of optical fiber links, such as, for instance, corresponding pairs of optical fibers within an optical cable. One may connect an end of the launch fiber 50 to an end of a first optical fiber link 80, then connect the opposing end of the first optical fiber link 80 to an end of the loopback fiber 78, connect the other end of the loopback fiber 78 to a co-located end of a second optical fiber link 82, and subsequently connect the other end of the second optical fiber link 82 to an end of the receive fiber 52. Of course, in such a measurement, the loopback fiber 78 may be calibrated with both the launch and receive fibers 50 and 52 to obtain first and second bias values. After an OTDR trace is obtained, the OTDR analysis is able to discriminate a first trace associated with the launch fiber 50, the first optical fiber link 80 and the loopback fiber 78 from a second trace associated with the loopback fiber 78, the second optical fiber link 82 and the receive fiber 52. Afterwards, the two traces can be processed independently one from the other. Indeed, from the first trace, a first optical loss value can be determined by adjusting a first preliminary optical loss value associated with the first trace with the first bias value associated with the bias due to the variation of MFD between the launch fiber 50 and the loopback fiber 78. Similarly, from the second trace, a second optical loss value can be determined by adjusting a second preliminary optical loss value associated with the second trace with the second bias value associated with the bias due to the variation of MFD between the loopback fiber 78 and the receive fiber 52. As will readily be understood by one skilled in the art, the first and second bias values can be obtained by a single bidirectional OTDR analysis performed on a fiber link having the launch fiber 50 serially connected to the loopback fiber 78 that is, in turn, serially connected to the receive fiber 52.

Also, it is readily understood that for measuring optical loss for more than two optical fiber links, multiple optical fiber links and loopback fibers may be serially concatenated in-between the launch and receive fiber 50 and 52.

It is further noticed that the embodiments presented herein may also apply to optical reflectometric technologies involving multi-pulsewidth acquisition for the analysis of an optical fiber link, for example Intellitrace Plus™ technology by Tektronix (http://www.tek.com, see also U.S. Pat. No. 5,155,439 (HOLMBO et al) and U.S. Pat. No. 5,528,356 (HARCOURT)) and Intelligent Optical Link Mapper (iOLM) technology by EXFO (see U.S. Pat. No. 8,576,389, Perron et al, "Multiple-Acquisition Optical Time Domain Reflectometric Method And Device", commonly owned by applicant). These technologies generally provide multi-pulsewidth acquisitions in which longer pulses enable identification of events that are more optically distant from the reflectometer and shorter pulses provide improved resolution for events that are optically closer to the reflectometer. It is therefore understood that the method for measuring an optical loss value of an optical fiber link which is free from a bias due to differing backscattering characteristics along the optical fiber link may also apply to these optical reflectometric technologies.

For instance, the tested optical fiber link may be represented as a list of events interleaved with optical fiber segments. This is particularly useful when employing the above-mentioned iOLM technology and is frequently used when employing more conventional OTDR technology. Events in the fiber optic link under test are identified and values of parameters characterizing the events (location, insertion loss and reflectance) and of parameters characterizing fiber segments in-between the events (attenuation) are extracted from a proper analysis of one or more reflectometric measurements performed on the optical fiber link. For instance, Table 1 provides measurement results for a complete optical fiber path having a launch fiber 50 measuring 5 000 meters, an optical fiber link 18 including four lengths of optical fiber and measuring 39 000 meters, and a receive fiber 52 measuring 6 000 meters.

TABLE 1

Location, insertion loss, reflectance and attenuation for a complete optical fiber path

| | | Location (m) | Insertion loss (dB) | Reflectance (dB) | Attenuation (dB/km) |
|---|---|---|---|---|---|
| launch fiber 50 | Event A | 0 | n/a | −50 | 0.15 |
| optical fiber link 18 | Event B | 5 000 | 0.5 | −45 | 0.15 |
| | Event C | 11 000 | 0.75 | −50 | 0.15 |
| | Event D | 24 000 | 8 | −10 | 0.15 |
| | Event E | 41 000 | 0.5 | −65 | 0.15 |
| receive fiber 52 | Event F | 44 000 | 0.5 | −50 | 0.15 |
| | Event G | 50 000 | n/a | −45 | |

With such a table, a preliminary optical loss value may not be obtained by subtracting a first return light signal value from a second return light signal value as it is the case using an OTDR trace. However, it can be obtained by adding the insertion loss and attenuation loss values along the optical fiber link 18. Nevertheless, the insertion loss and the attenuation loss values will still be dependent upon the return light signal values.

For instance, the preliminary optical loss value associated with the optical fiber link 18 of Table 1 can be obtained by calculating $POLV_{A\_B}$=0.5 dB+0.75 dB+8 dB+0.5 dB+0.5 dB+(44 km−5 km)·0.15 dB/km=16.1 dB. As an example, if a bias value $BV_{A\_B}$=0.25 dB characterizes the pair of launch and receive fibers 50 and 52, the optical loss value OLV can be computed as $OLV=POLV_{A\_B}-BV_{A\_B}$=16.1 dB−0.25 dB=15.85 dB.

Alternatively, as described above, if the launch and receive fibers 50 and 52 are calibrated using a reference fiber 54, a first relative bias value $RBV_L$=0.10 dB between the launch fiber 50 and a first reference fiber 54 and a second relative bias value $RBV_R$=−0.15 dB between the receive fiber 52 and the reference fiber 54 are obtained. The apparent insertion loss associated with the connection (event B) between the launch fiber 50 and the optical fiber link 18 may be corrected using the first relative bias value ($IL_B'=IL_B-RBV_L$=0.5 dB−0.1 dB=0.4 dB), and the apparent insertion loss associated with the connection (event F) between the optical fiber link 18 and the receive fiber 52 may be corrected using the second relative bias value ($IL_F'=IL_F--RBV_R$=0.5 dB−0.15 dB=0.35 dB) (it should be noted that the sign of the relative bias value needs to be reversed because the second relative bias value corresponds to a connection from the receive fiber to the reference fiber, whereas in the insertion loss measurement is made from the optical fiber link 18 to the receiver fiber). The optical loss value associated with the optical fiber link 18 of Table 1 can then be determined by processing $OLV_{A\_B}$=0.4 dB+0.75 dB+8 dB+0.5 dB+0.35 dB+(44 km−5 km)·0.15 dB/km=15.85 dB. It should be appreciated that, since both calibration methods are equivalent ($PBV_L+PBV_R=BV_{A\_B}$), the so-determined optical loss values are the same.

In addition, receive fibers can be adapted to exhibit reflectance signatures that can be specific to each of the receive fibers (e.g. see U.S. Pat. No. 8,482,725 B2 granted to Perron et al. and commonly owned by applicant). By providing such receive fibers, continuity measurements can be performed using single-ended OTDR measurements. Indeed, in the case where a first technician performs a single-ended OTDR measurement on an optical fiber link 18 using launch and receive fibers 50, 52 alone, validating that the optical fiber link is continuous is uncertain. In some circumstances, the optical fiber link 18 could be broken at some point remote from the launch fiber 50 and assuring that information can be securely propagated from one end of the optical fiber link 18 to the other is not possible as a rupture of the optical fiber link could easily be mistaken for the end of the receive fiber. In order to validate that the optical fiber link 18 is continuous, another technician may, for instance, connect an encoded receive device 84 having a reflectance signature. With such an embodiment, the OTDR operated by the first technician can be adapted to recognize the reflectance signature of the encoded receive device 84 in the measured single-ended OTDR trace and confirm that the light pulses actually reach the receive fiber. Once the receive fiber is identified, the continuity of the optical fiber link can be validated.

In one embodiment, if the receive fiber has non-angled connectors at both ends, the distance between reflections caused by these connectors (which corresponds to the length of the receive fiber) may serve as a reflectance signature. The reflectance signature then consists of two reflective events separated by a predetermined distance. However, if angled-polished connectors are employed, this may not suffice. In this case, another reflectance signature feature may be included in the receive fiber or device.

Figures 9A, 9B:
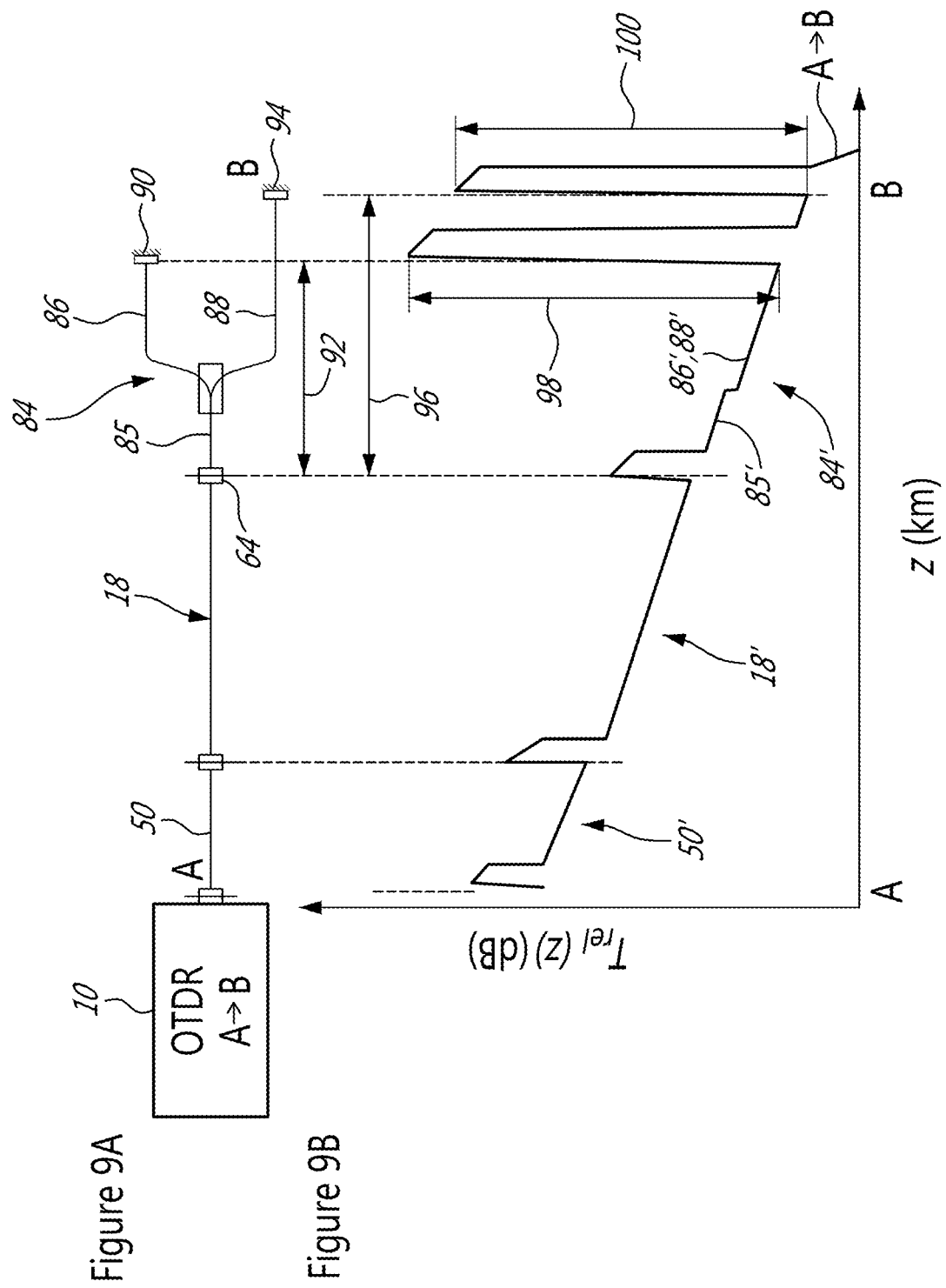
FIG. 9A shows a block diagram illustrating a single-ended OTDR measurement on a complete optical fiber path which has an encoded receive device.
FIG. 9B shows an example of an OTDR trace associated with the block diagram of FIG. 9A which allow identifying a signature of the encoded receive device of FIG. 9A.

In that respect, FIG. 9A shows a block diagram illustrating a single-ended OTDR measurement on a complete optical fiber path which has an encoded receive device. FIG. 9A illustrates an exemplary encoded receive device 84 but it will be understood that reflectance signatures may be provided by a variety of configurations (e.g. see U.S. Pat. No. 8,482,725 B2 granted to Perron et al. and commonly owned by applicant). In this example, the encoded receive device 84 has a common length of fiber 85 that serves as the receiver fiber, followed by a 50/50 coupler which divides the encoded device 84 into first and second arms 86 and 88. Accordingly, the first arm 86 may have a first reflective member 90 at a first known distance 92 from the connection 64 between the optical fiber link 18 and the encoded receive device 84. Furthermore, the second arm 88 may have a second reflective member 94 at a second known distance 96 from the connection 64 between the optical fiber link 18 and the encoded receive device 84. The first known distance and the difference between the first known distance and the second known distance provide a signature readily identifiable by the OTDR. The launch fiber 50 and the encoded receive device 84 can be calibrated together or relative to a reference fiber as described hereinabove. It is noted that it is the bias corresponding to the differing backscattering characteristics between the launch fiber 50 and the receive fiber 85 (or between the launch fiber 50 and a reference, and between the reference and the receive fiber 85) that is characterized during the calibration procedure. In other words, portions 86', 88' are not considered during the calibration procedure. Moreover, FIG. 9B shows an example of an OTDR trace associated with the block diagram of FIG. 9A. In this OTDR trace A→B, each of the launch fiber 50, the optical fiber link 18 and the encoded receive device 84 can have an associated portion 50', 18', and 84'. One skilled in the art may appreciate the high reflectance peaks 98, 100 of portions 86', 88' of the OTDR trace A→B. When located at the specific distances 92, 96 therebetween on the OTDR trace A→B, these high reflectance values 98, 100 can be indicative of the continuity of the optical fiber link 18. It is noted that the height of the reflectance peaks 98, 100 relative to the backscattering level may also serve as a signature feature.

It will be appreciated that the encoded receive device of FIG. 9A may also be employed with non-angled connectors, in order to facilitate the reliable identification of the end of the optical fiber link 18. In an embodiment, it is noted that although the encoded receive device 84 can be provided in the form a single device (as shown in FIG. 9A), the encoded receive device 84 can be obtained by linking separate optical devices. For instance, in another embodiment, the encoded receive device 84 includes a second optical fiber length serially connected to a signature device.

Still referring to the encoded receive device 84 of FIG. 9A, it is noted that, for measurements where the total loss of the optical fiber link under test is high, the dynamic range of the OTDR may not be sufficient to allow backscattering light 85' corresponding to receive fiber 85 in the OTDR trace to be distinguished, because the low level of backscattering light 85' will fall below the noise floor. However, the high reflectance peaks 98, 100 will more likely be identifiable and measurable. The levels of these high reflectance peaks 98, 100, if previously referenced, may be used instead of the backscattering light of the receive fiber 52 or 85 to determine the total insertion loss of the optical fiber link under test. The reflectance levels may be compared to the first return light signal value 56 corresponding to the backscattering light level just before connection 62 between the launch fiber 50 and the optical fiber link 18 to determine the total insertion loss of the optical fiber link under test. The relative offset between the reflectance levels of the reflectance peaks 98, 100 and the backscattering level 85' may be determined during the calibration process. Once this relative offset is known, the reflectance levels of the high reflectance peaks 98, 100 are indicative of the backscattering level 85' that would appear in the OTDR trace were the dynamic range be sufficient to measure it. Then, knowing the bias value introduced by the variation of backscattering characteristics between the launch and receive fibers 50, 85, or equivalently relative bias values of both the launch and receive fibers 50, 85 relative to a reference fiber, the total insertion loss of the optical fiber link under test may be determined as described hereinabove.

In another embodiment, the multiplicity of receive fibers 70 of FIG. 7, for instance corresponding to fibers within an optical cable, can be individually and distinctly encoded in order to provide recognition means to differentiate, for instance, the encoded receive fiber (or device) R1 from the encoded receive fiber R2. Each of the encoded receive fibers of the multiplicity of receive fibers may have a reflectance signature that may be a combination of a distance at which a reflective feature is located along the encoded receive fiber, a distance between two reflective features, the height of the reflectance peak associated with a reflective feature and the relative height from one reflectance peak to another. If each of the encoded receive fibers is associated with a corresponding optical fiber link, the encoded receive fibers can both allow continuity measurements and identification of the optical fiber links. Consequently, the first technician can identify the optical fiber link measured on an OTDR trace solely from the distinct reflectance signature of the corresponding encoded receive fiber. Of course, other encoding schemes for the encoded receive fiber 84 can be envisaged.

As can be seen therefore, the examples described above and illustrated are intended to be exemplary only. It should be noted that, although the underlying theory of the methods, systems and kits described herein is developed for single-mode optical fibers, the same principle equally applies to multi-mode optical fibers in order to obtain an optical loss measurement that is free from a bias associated with varying backscattering characteristics along an optical fiber link. The scope is indicated by the appended claims.

What is claimed is:

1. A reflectometric method for measuring an optical loss value of an optical fiber link, the method comprising:
   obtaining at least one bias value being indicative of a bias induced by differing backscattering characteristics of a first optical fiber length and a second optical fiber length;
   propagating at least one test signal serially into the first optical fiber length, the optical fiber link and the second optical fiber length;
   monitoring at least one return signal resulting respectively from the propagation of the at least one test signal; and
   determining the optical loss value based on the at least one return signal and the at least one bias value.

2. The reflectometric method of claim 1, wherein said determining comprises:
   determining a preliminary optical loss value based on the at least one return test signal; and
   measuring the optical loss value by adjusting the preliminary optical loss value based on the at least one bias value.

3. The reflectometric method of claim 1, wherein said determining comprises:
   adjusting at least one portion of the at least one return signal with a corresponding one of the at least one bias value; and
   measuring the optical loss value based on the adjusted at least one return signal.

4. The reflectometric method of claim 1, wherein the reflectometric method is a single-ended Optical Time-Domain Reflectometric (OTDR) method, wherein the test signal comprises at least one test light pulse and wherein the return signal is obtained by propagating the at least one test light pulse into and along a complete optical fiber path made of the first optical fiber length having one end connected to an end of the optical fiber link and the other end of the optical fiber link connected to an end of the second fiber length; and detecting the corresponding return signal from the complete optical fiber path as a function of time so as to obtain a reflectometric trace representing backscattered and reflected light from the at least one test signal as a function of distance of the complete optical fiber path.

5. The reflectometric method of claim 2, wherein said obtaining at least one bias value further comprises obtaining a bias value corresponding to a calibration optical fiber link having a connection between the first optical fiber length and the second optical fiber length.

6. The reflectometric method of claim 5, wherein said obtaining a bias value corresponding to a calibration optical link further comprises obtaining a forward-measured connection loss value and a backward-measured connection loss value, each of the connection loss values representative of a difference in the backscattering level occurring in the calibration optical link at the connection between the first optical fiber length and the second optical fiber length, and wherein the bias value is based on the forward-measured connection loss value and the backward-measured connection loss value.

7. The reflectometric method of claim 6, wherein the bias value is proportional to the difference between the forward-measured connection loss value and the backward-measured connection loss value.

8. The reflectometric method of claim 3, wherein said obtaining at least one bias value further comprises obtaining a first relative bias value corresponding to a first calibration optical fiber link having a first connection between the first optical fiber length and a reference optical fiber; and obtaining a second relative bias value corresponding to a second calibration optical fiber link having a second connection between the reference optical fiber and the second optical fiber length.

9. The reflectometric method of claim 8, wherein said obtaining a first relative bias value corresponding to a first calibration optical fiber link further comprises obtaining a first forward-measured connection loss value and a first backward-measured connection loss value; wherein said obtaining a second relative bias value corresponding to a second calibration optical fiber link further comprises obtaining a second forward-measured connection loss value and a second backward-measured connection loss value; wherein each of the connection loss values being representative of a difference in the backscattering level occurring along the corresponding calibration optical link at the position of the corresponding connection; and wherein the first and second relative bias value are based on the corresponding forward-measured connection loss values and the backward-measured connection loss values.

10. The reflectometric method of claim 8, wherein said determining the optical loss value further comprises adjusting first and second portions of the at least one return signal with the corresponding first and second relative bias value; and measuring the optical loss value based on the adjusted at least one return signal.

11. The reflectometric method of claim 1, wherein said obtaining at least one bias value further comprises obtaining an additional bias value being indicative of a bias induced by differing backscattering characteristics of the second optical fiber length and a third optical fiber length; wherein said propagating further comprises propagating the at least one test signal from the second optical fiber length directly into an additional optical fiber link, from the additional optical fiber link directly into a third optical fiber length for propagation therealong; and wherein said determining further comprises determining an additional optical loss corresponding to said additional optical fiber link based on the at least one return signal and the additional bias value.

12. The reflectometric method of claim 1, wherein the first optical fiber length is included in a multiplicity of first optical fiber lengths and the second optical fiber length is included in a multiplicity of second optical fiber lengths; wherein each of a plurality of optical fiber links is connectable in-between corresponding first and second optical fiber lengths of the multiplicities.

13. The reflectometric method of claim 1, wherein the second optical fiber length is connected to a signature device having a reflectance signature to form an encoded receive device, and wherein the method further comprises recognizing said signature using the monitored at least one return signal to confirm a continuity of the optical fiber link.

14. The reflectometric method of claim 13, wherein the reflectance signature is provided by a reflective member located at a specific distance from the optical fiber link.

15. The reflectometric method of claim 13, wherein the encoded device is split into a first arm and a second arm, the first arm having a first reflective member located at a first distance from the optical fiber link, the second arm having a second reflective member located at a second distance from the optical fiber link.

16. A system for measuring an optical loss value occurring along an optical fiber link, the system comprising:
an optical test signal generator for generating a test signal to be propagated serially along a first optical fiber length, the optical fiber link and a second optical fiber length, the first optical fiber length and the second optical fiber length being characterized by a bias value indicative of a bias induced by differing backscattering characteristics of the first optical fiber length and the second optical fiber length;
an optical detector for monitoring a return signal resulting from the propagation of the test signal; and
a processor configured for determining an optical loss value based on the return signal and the bias value.

17. The system of claim 16, wherein the bias value is based on a forward-measured connection loss value and on a backward-measured connection loss, each of the connection loss values being representative of a difference in the backscattering level occurring in a calibration optical link at the connection between the first optical fiber length and the second optical fiber length; and wherein the bias value is based on the forward-measured connection loss value and the backward-measured connection loss value.

18. The system of claim 17, wherein the processor is configured to determine the optical loss value by adjusting the bias value from a preliminary optical loss value of the return signal.

19. The system of claim 16, wherein the optical test signal generator, the optical detector and the processor are provided in the form of an optical time-domain reflectometer (OTDR).

20. The system of claim 16, wherein the second optical fiber length is connected to a signature device having a reflectance signature to form an encoded receive device, wherein the processor is configured to recognize said signature using the monitored return signal to confirm a continuity of the optical fiber link.

21. The system of claim 20, wherein the encoded device has a reflective member located at a specific distance from the optical fiber link.

22. The system of claim 20, wherein the encoded device is split into a first arm and a second arm, the first arm having a first reflective member located at a first distance from the optical fiber link, the second arm having a second reflective member located at a second distance from the optical fiber link.

23. The system of claim 16, wherein the first optical fiber length is included in a multiplicity of first optical fiber lengths and the second optical fiber length is included in a multiplicity of second optical fiber lengths; wherein each of a plurality of optical fiber links is connectable in-between corresponding first and second optical fiber lengths of the multiplicities.

* * * * *